Patented Sept. 26, 1933

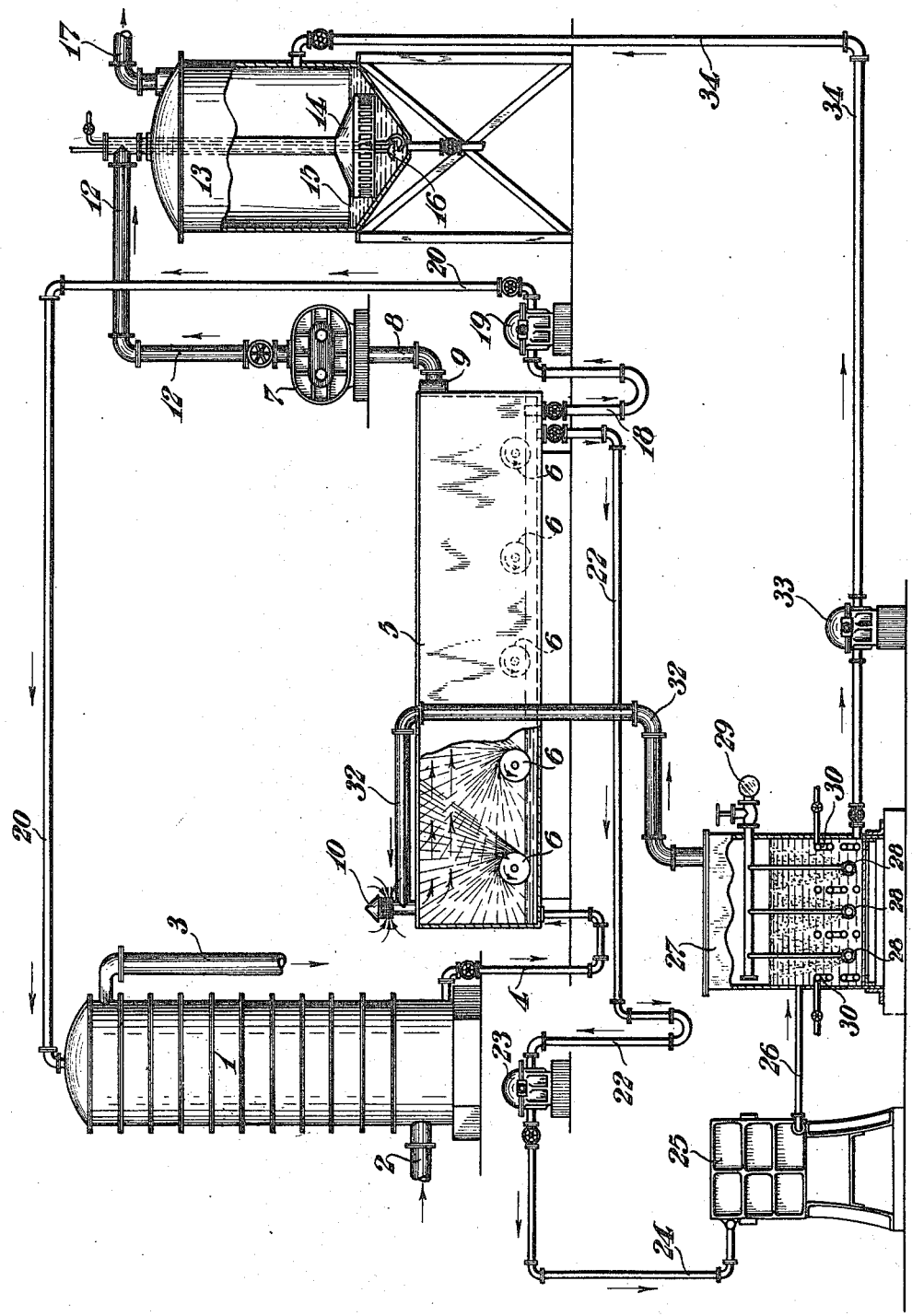

1,928,509

UNITED STATES PATENT OFFICE 1,928,509

GAS PURIFICATION PROCESS

Frederick W. Sperr, Jr., Pittsburgh, Pa., assignor to The Koppers Company of Delaware, a corporation of Delaware Application May 19, 1927. Serial No. 192,584

4 Claims. (Cl. 23—3)

This invention relates to a process and apparatus for the removal of hydrogen sulphide and analogous acidic impurities from fuel gas such as coal gas, coke oven gas and the like.

In my prior copending application for U. S. Letters Patent, Serial No. 124,556, filed July 24, 1926 (Patent 1,841,419 granted Jan. 19, 1932), I describe and claim a process of purifying gas which comprises, in brief, washing the gas with an alkaline liquid containing sufficient catalyst, such as a cobalt compound or an iron compound, to convert hydrogen sulphide absorbed by said liquid to fixed compounds such as sodium thiosulphate upon revivification of said liquid, without liberating sulphur or hydrogen sulphide.

The present invention relates more particularly to the use of an ammoniacal solution or suspension containing similarly limited amounts of catalyst for gas purification.

An object of my invention is to provide a process and apparatus effective to remove impurities from fuel gas with ammonia as alkali without liberating sulphur and without releasing hydrogen sulphide or ammonia into the atmosphere.

Another object of my invention is to provide apparatus suitable for the actification of sulphided ammoniacal solutions.

A further object of my invention is to provide a process and apparatus for treating solutions or suspensions previously used for gas purification to convert compounds produced therein to other and more advantageous compounds, such as may be recovered from the gas at other stages of treatment of said gas.

My invention has for further objects such other operative advantages or results as may be found to obtain herein and in my above-recited copending application.

In actifying or regenerating an ammoniacal solution or suspension which has previously been used to remove hydrogen sulphide and the like from gas, it is highly desirable to prevent the liberation of ammonia into the atmosphere. If, for example, such actification were carried on in the so-called thionizer, which is comprised of an open tank adapted to receive the liquid to be actified and containing a plurality of foraminous aerators immersed in said liquid, the air passing through the liquid and emerging from the surface thereof will carry large amounts of ammonia released by the liquid. The atmosphere in and around such a thionizer would contain large amounts of ammonia, and might even become unbearable.

While it has been proposed to cover the thionizer and this proposal has considerable merit, it is usually desirable not to impede ready access to any aeration apparatus in which foraminous aerators and more particularly fabric aerators are provided.

I have found that closed mechanical agitators or aerators are particularly effective and advantageous for the actification of fouled ammoniacal liquids. A number of types of such aerators have been tried and have been found satisfactory. For example, the so-called Christiansen spray. Such apparatus is comprised of a plurality of horizontally rotating cylinders partially immersed in a body of the liquid being treated. The rotation of the cylinders causes a spray or fog of finely divided articles or droplets of the liquid. This spray or fog is preferably confined in the chamber through which is passed or drawn an oxygen-containing gas, such as air, or any other gas capable of effecting an actification of said liquid. Accordingly, I provide means for passing a gas through a spray or fog induced in this manner and for confining and treating the gas after passing through said spray or for the removal of ammonia or other noxious gas therefrom.

In my invention, I provide a process of converting sulphides in solution to thiosulphate, more particularly ammonium thiosulphate, and I further provide means for treating portions of the resultant liquid to remove insoluble material therefrom and subsequently to convert ammonium thiosulphate to ammonium sulphate. Since, in the treatment of fuel gas ammonia is quite generally removed from the gas in the form of ammonium sulphate, the additional amounts of ammonium sulphate removed in this way may be added to the sulphate recovered in the treatment of the gas for the removal of ammonia and I thus avoid a multiplicity of by-products. It is to be noted, also, that my process does not involve the liberation of sulphur.

In order that my invention may be clearly set forth and understood, I will now describe, with reference to the accompanying drawing, the preferred manner in which it is practiced and embodied.

The single figure is an elevational view of apparatus for purifying gas and for regenerating the sulphided ammoniacal solution, parts being broken away.

In the process of my invention, I prefer to treat the gas for removal of hydrogen sulphide therefrom prior to complete removal of ammonia from the gas as, in this manner, the ammonia present in the gas may be relied upon to serve as alkali for the gas purification liquor. An absorber 1 is consequently placed in the path of the gas prior to complete removal of ammonia therefrom. The absorber 1 is preferably of the well-known bell-and-tray type, such as is commonly used for the treatment of ammoniacal gases or vapors, although other types of absorbers, such as the static or hurdle type, may be employed. The gas enters the lower part of the absorber 1 through an inlet 2 and passes upward in counter-current with a downwardly flowing ammoniacal suspension of metallic compound, such as the oxide or hydroxide of cobalt or nickel, in amount insufficient to cause the liberation of sulphur in the subsequent aeration stage.

Some of the ammonia contained in the gas and substantially all of the acidic impurities are absorbed by the suspension and the gas passes out of the absorber 1 through an outlet pipe 3. The fouled ammoniacal liquid passes from the absorber 1 through a sealed outlet pipe 4 into a crystalline spray chamber 5. The spray chamber 5, completely enclosed, is provided with a plurality of horizontally disposed cylinders 6, which are adapted to rotate rapidly while partially immersed in the fouled liquid, thus causing the interior of the chamber 5 to be substantially entirely filled with a spray or fog of fine particles or droplets, or other liquid.

In the present instance, I prefer to use air for actification of the gas purification liquid, although other oxygen-containing gases may be employed. I provide an exhauster 7 for drawing air through the interior of the spray chamber 5. The exhauster 7 communicates with the chamber 5 through a conduit 8 and a spray catcher or trap 9, preferably situated at one end of the chamber 5, while an air inlet 10 is provided at the opposite end of the chamber 5. The gas drawn through the chamber 5 by the exhauster 7 effects a revivification or regeneration of the fouled gas purification liquid, causing a conversion of the dissolved sulphides to ammonium thiosulphate without liberating hydrogen sulphide.

The air passing through the exhauster 7 contains considerable amounts of ammonia removed form the gas purification solution. Accordingly, I conduct this air through a conduit 12 into ammonia-recovery apparatus that is preferably constituted of a saturator 13. The saturator 13 is of the well-known type, being provided with a gas-diffusing bell 14, that is immersed in a bath of sulphuric acid 15. Ammonia carried by the air passing through the bath 15 reacts with the sulphuric acid to form ammonium sulphate. As crystals of ammonium sulphate accumulate in the bath 15, they may be removed by means of an injector 16 of usual type. The air freed from ammonia escapes from the saturator 13 through a conduit 17.

The gas purification liquid in passing through the spray chamber 5 is thoroughly actified and passes out of the chamber 5 through a sealed overflow pipe 18 and is forced by a pump 19 through conduit 20 into the absorber 1 for treatment of further quantities of gas.

Catalyst is added to the gas purification liquid in the chamber 5 and elsewhere in the cycle as required. In the performance of the purification process, the amount of ammonium thiosulphate in the gas purification liquid gradually rises. When the concentration of this material reaches a predetermined point, a portion of the liquid is withdrawn from the spray chamber 5 through a conduit 22 by a pump 23. This liquid is forced through a conduit 24 into a filter press 25, where insoluble material, such as catalyst and small amounts of adventitious sulphur (if produced at all), are removed.

The filtrate passes through a conduit 26 into a closed reaction vessel 27. The reaction vessel 27 is provided with a plurality of foraminous aerators 28 that are supplied with compressed air from a conduit 29 and with a plurality of steam coils 30. The filtered gas purification liquid is heated to near the boiling point by means of the steam coils 30 and aerated by means of aerators 28 until conversion of ammonium thiosulphate to ammonium sulphate is effected.

The vapors emerging from the solution within the reaction vessel 27 may contain considerable amounts of sulphur dioxide. Accordingly, I provide a conduit 32 for conducting these vapors to the inlet 10 of the spray chamber 5. These vapors are thus drawn through the spray chamber 5 with the air being passed through the chamber by the exhauster 7 and the sulphur dioxide is neutralized by the ammonia present within the chamber 5.

After conversion of the ammonium thiosulphate to ammonium sulphate is effected, the liquid within the reaction vessel 27 is evaporated to a sludge of ammonium sulphate crystals. This sludge may be forced by a pump 33 through a conduit 34 into the bath 15 maintained within the saturator 13, the ammonium sulphate being withdrawn from the saturator recovered from the treatment of the ammoniacal air.

A separate evaporator may be added for reducing the ammonium sulphate solution to a sludge, if this proves desirable, but ordinarily the evaporation may be conducted within the vessel 27.

With regard to the amount of catalyst contained by the recirculating gas purification liquid, it may be stated that as much catalyst as may be added without causing the liberation of free sulphur in the aeration stage is preferable and ordinarily when iron compounds are used, it is preferred to maintain these in amount less than the equivalent of 0.1% of $Fe_2O_3$, while, when cobalt or nickel compounds are employed, still smaller amounts are desirable. The appearance of sulphur in the gas purification liquid is an indication that an excess of catalyst is present and further additions of catalyst are suspended until sulphur is no longer liberated.

My invention provides a process and apparatus for treating gas for removal of acidic impurities in which ammonia present in the gas may be employed as alkali and my invention is particularly adapted to accomplish the actification of such an ammoniacal gas purification liquid without liberating noxious gas into the atmosphere and without liberation of sulphur.

My invention is not limited to the specific example given hereinabove by way of illustration but may variously be embodied and practiced within the scope of the following claims.

I claim as my invention:

1. The process of regenerating a spent liquid previously employed for the removal of hydrogen sulphide from a gas which comprises exposing said liquid in the form of a fog to an oxygen-containing gas.

2. The process of regenerating a previously sulphided ammoniacal suspension of a metallic compound which comprises bringing said suspension into the form of a fog and passing an oxygen-containing gas through said fog.

3. The process of purifying a gas from hydrogen sulphide which comprises washing the gas with an ammoniacal absorbent liquid, removing the liquid after contact with the gas and exposing it in a finely divided condition to a current of an oxygen-containing gas in the presence of a catalyst present in amount sufficient to prevent the liberation of hydrogen sulphide and to promote the conversion of absorbed sulphide substantially entirely to a fixed thiocompound of ammonia but insufficient to cause the liberation of elemental sulphur.

4. The process of purifying a gas from hydrogen sulphide which comprises washing the gas with an ammoniacal absorbent liquid, removing the liquid after contact with the gas and exposing it in a finely divided condition to a current of an oxygen-containing gas in the presence of a compound of a metal of the iron subgroup of the eighth group of the periodic system present in amount sufficient to prevent the liberation of hydrogen sulphide and to promote the conversion of absorbed sulphide substantially entirely to a fixed thio-compound of ammonia but insufficient to cause the liberation of elemental sulphur.

FREDERICK W. SPERR, Jr.